Figure 1:
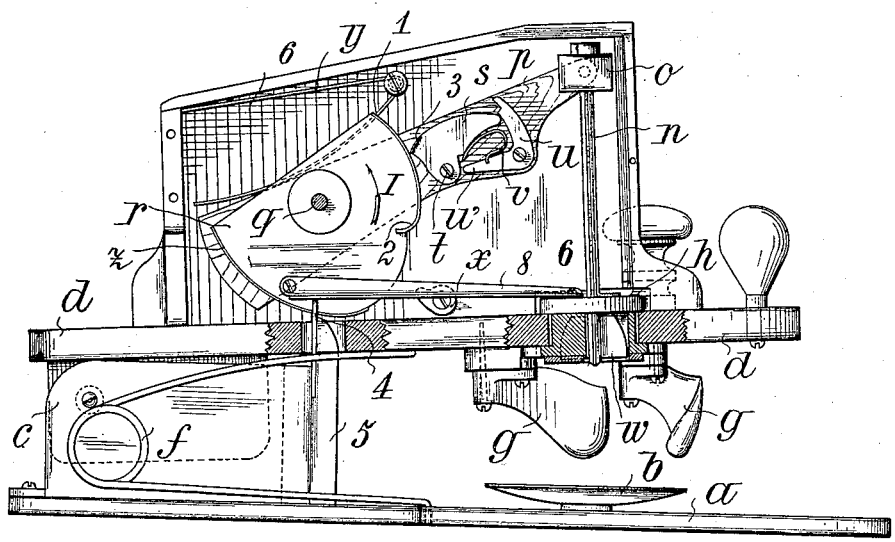

H. SIEGL & J. ENGEL.
MACHINE FOR FORMING AND INDENTING ROLLS OF DOUGH.
APPLICATION FILED MAR. 1, 1912.

1,071,592.

Patented Aug. 26, 1913.

2 SHEETS—SHEET 1.

WITNESSES
Sidney Brooks
L. J. Gallagher

INVENTORS
Heinrich Siegl
Julius Engel
BY Munn & Co
ATTORNEYS

H. SIEGL & J. ENGEL.
MACHINE FOR FORMING AND INDENTING ROLLS OF DOUGH.
APPLICATION FILED MAR. 1, 1912.
1,071,592.
Patented Aug. 26, 1913.
2 SHEETS—SHEET 2.
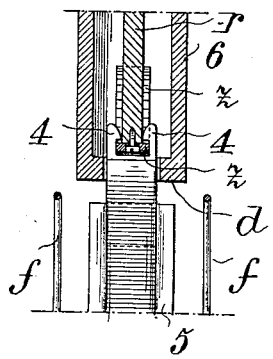
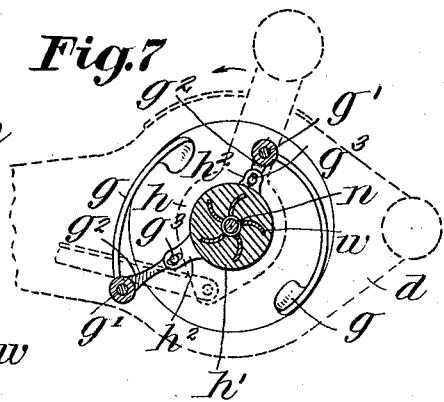
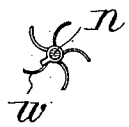
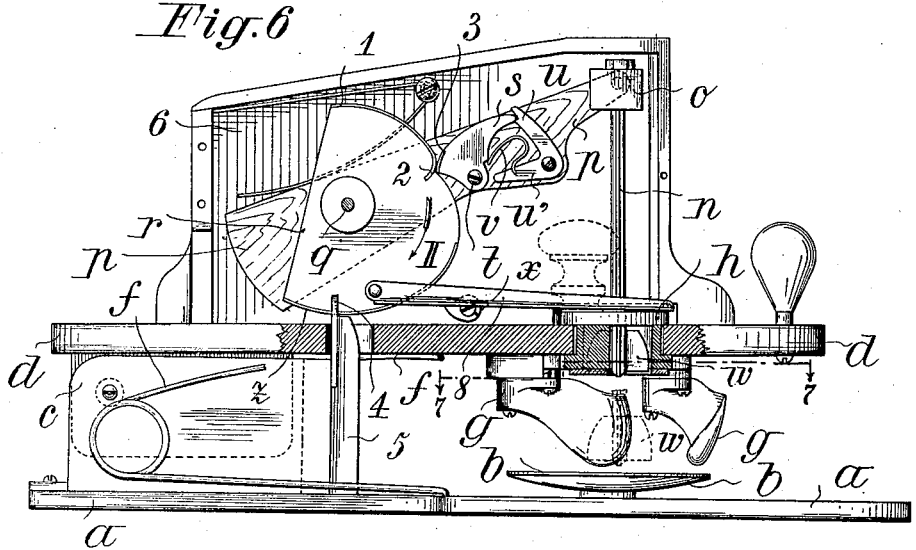
WITNESSES
Sidney Brooks
L. J. Gallagher
INVENTORS
Heinrich Siegl
Julius Engel
BY
ATTORNEYS

UNITED STATES PATENT OFFICE.

HEINRICH SIEGL, OF VIENNA, AND JULIUS ENGEL, OF FELIXDORF, AUSTRIA-HUNGARY.

MACHINE FOR FORMING AND INDENTING ROLLS OF DOUGH.

1,071,592.  Specification of Letters Patent.  Patented Aug. 26, 1913.

Application filed March 1, 1912. Serial No. 680,823.

*To all whom it may concern:*

Be it known that we, HEINRICH SIEGL, baker, and JULIUS ENGEL, miller, subjects of the Emperor of Austria-Hungary, and residents, respectively, of Vienna and of Felixdorf, in the Empire of Austria-Hungary, (whose post-office addresses are, respectively, No. 25 Deinhardtsteingasse, Sixteenth district, and Felixdorf,) have invented a certain new and useful Machine for Forming and Indenting Rolls of Dough, of which the following is a specification.

The attempts that have been made to effect the difficult and lengthy manual operations for forming channels or otherwise indenting rolls of dough as completely and effectually by mechanical means, have led to the construction of machines in which by means of indenting blades mounted so as to oscillate in the path of a circle and operated so as to be simultaneously brought together, the dough is treated or worked in a similar way to that in which this operation is performed by hand. The blades oscillate together in the vertical axis of the lump of dough or intersect whereby the dough is indented. A longitudinally displaceable centering pin is employed for holding the lump of dough to be formed or shaped, which pin is lifted out of the dough during the actuation of the blades. This machine however presents the defect that the opening formed by the entrance of the centering pin in the mass of dough is not closed by the blades and this not only impairs the appearance of the roll but is also harmful in the baking operation and prejudicially affects the flavor of the bread when baked. If, on the other hand, the centering pin is dispensed with, the roll formed by the machine is much too high; it presents more the form of a cake and furthermore the outer part is nothing like so cleanly shaped as by hand formation, which is also prejudicial to the appearance of the rolls and to the success of the baking operation. This defect in the known apparatus is remedied by the present invention.

With this object an indenting device comprising a series of blades displaceable upward and downward and mounted between the roll-forming blades is provided which coöperates with the latter, the blade of said device being curved to correspond with said forming blades.

This indenting device depresses the upper part of the roll and forms thereon clean lines or indentations so that the machine produces a roll absolutely similar to those formed by hand, whereby the baking operation proceeds in precisely the same manner as with hand-made rolls and the taste is the same.

Figure 2:
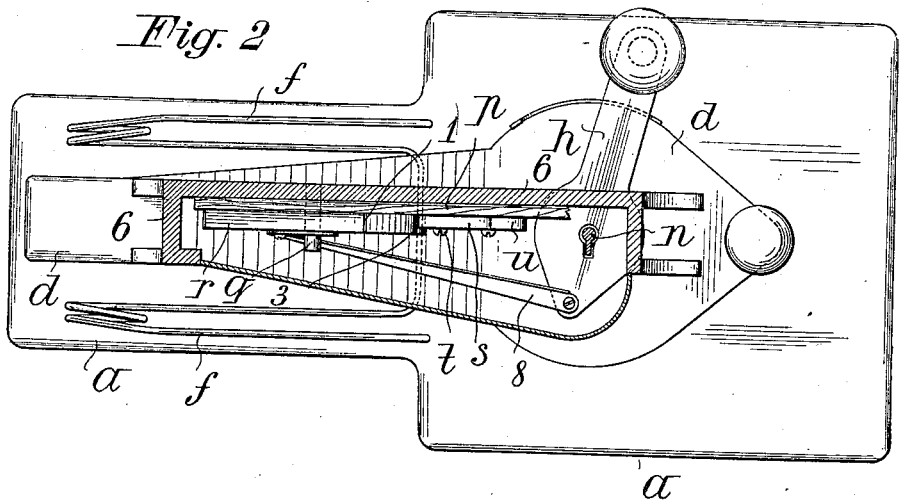

An embodiment of the improved machine is illustrated by way of example in the accompanying drawing, in which:

Figure 1 shows the machine in longitudinal section. Fig. 2 is a cross section thereof. Fig. 3 illustrates a detail. Fig. 4 and 5 show the centering pin in elevation and lower plan respectively. Fig. 6 is a longitudinal section through the machine with its parts in another position, and Fig. 7 is a horizontal section on the line 7—7 of Fig. 6, illustrating the mechanism for operating the forming blades.

A saucer $b$ is fixed to the base plate $a$ of the machine, the lump of dough from which the roll is to be formed being placed thereon. On a bearing block $c$ on the base plate an arm $d$ is pivotally mounted and is subjected to the action of a spring $f$. Upon the arm $d$ a plurality of dough-forming blades $g$ curved cylindrically are mounted to oscillate along the path of a circle and are caused to approach each other by means of suitable mechanism actuated by the operation of a handle $h$. The mechanism for operating the blades $g$ is shown in Fig. 7. The handle $h$ has a boss $h'$ on its underside mounted to turn in an opening in the arm $d$. The blades $g$ are fulcrumed at $g'$ on the arm $d$ and are provided with arms $g^2$ connected by pins $g^3$ with slotted lugs $h^2$ on the boss $h'$. A pin $n$ extends between the dough-forming blades $g$ through the handle $h$ and the hole in the arm $d$, its upper end engaging an upwardly and downwardly displaceable slide member $o$ which is connected to a lever $p$ pivotally mounted in the machine-casing 6 carried by the arm $d$. A cam plate $r$ is mounted on the pivot $q$ of the lever $p$ and bears against the portion 3 of a lever $s$; this lever $s$ presents substantially the form of an arc of a circle and is rotatably mounted on a pin $t$ carried by the lever $p$. An angular locking pawl $u$ $u'$ of the shape of a bell-crank lever coöperates with the lever $s$, its arm $u'$ being adapted to bear against the lower portion of the lever $s$.

The lever $s$ and the pawl $u$ $u'$ are subjected to the action of a spring $v$ which tends to press the part 3 of the lever $s$ against the cam $r$ and the stepped end of the lever $u$ against the end of the lever $s$. During the initial movement of the cam plate $r$, in the direction indicated by the arrow in Fig. 1, when the arcs 1, 2 travel over the angle piece 3 of the lever $s$, this lever is rotated inward in overcoming the pressure of the spring $v$ without the lever $s$ or pawl $u$ $u'$ being influenced by the cam plate. During this movement of the cam plate the kneading or forming blades rock toward each other. When the angle 3 of the lever $s$ enters the incision 2 in the cam plate, this lever $s$ rocks upward under the action of the spring $v$ and at the same time the pawl $u$ $u'$ reaches the position in which the lever $s$ engages in the stepped end of the arm $u$ of the pawl $u$ $u'$ and establishes a positive connection between the lever $s$ and pawl $u$ $u'$. This results in coupling the lever $p$ with the lever $s$ so that upon further rotation of the cam plate $r$ the lever $s$ and with it the lever $p$ rock downward carrying the pin with them. The pin $n$ carries a series of radially arranged blades $w$ which are curved in correspondence with the dough forming blades $g$. When the lever $p$ rocks downward the pin $n$ and the blades carried thereby enter the lump of dough in the saucer $b$ pressing the roll flat and forming the upper end of the several indentations in the roll. At the end of the downward oscillation of the lever $p$ the arm $u'$ of the pawl $u$ strikes against a stop $x$ arranged on the machine-casing 6 thus rotating the pawl $u$ $u'$ so that the lever $s$ is rotated into the position shown in Fig. 1 by the action of its spring $v$. The lever $p$ is now uncoupled from the lever $s$ and under the influence of the spring $y$ on the casing 6 swings back automatically into its initial position and causes the pin $n$ with the blades $w$ to rise.

On its lower part the cam plate $r$ carries a flange $z$ (Figs. 1 and 3) which, upon the rotation of the plate, is embraced by two hooks 4 fixed to an upright 5 on the base plate $a$. The upright 5 extends through an opening in the plate $d$, the latter having a slight movement relative to the fixed upright. When the plate $r$ rotates, owing to the engagement of the hooks 4 on the upright 5 with the flange $z$ of the cam plate, the arm $d$ is somewhat depressed so that the blades $g$ simultaneously with rocking toward each other penetrates the lump of dough more deeply and thus imitate the movement of the hand in forming the indentations in the roll very closely.

For the purpose of actuating the cam plate $r$ it is connected by a rod 8 with the driving crank $h$ of the driving mechanism of the blades $g$ so that every part of the machine is rendered operative by the actuation of the crank $h$.

What we claim and desire to secure by Letters Patent of the United States is:—

1. A machine for forming and indenting rolls of dough comprising a plurality of operative roll-forming blades, a movable device having a series of blades coöperating with and mounted between the forming blades, a lever for effecting the movement of said device, and means operated during the movement of the roll-forming blades for actuating said lever.

2. A machine for forming and indenting rolls of dough comprising a plurality of roll-forming blades mounted to oscillate in the path of a circle and simultaneously displaceable, a movable device comprising a series of blades coöperating with and mounted between the forming blades, the individual blades of said device being curved correspondingly to the said forming-blades, a lever for depressing the said device, and means operated during the movement of the roll-forming blades for actuating said lever.

3. A machine for forming and indenting rolls of dough comprising in combination a plurality of roll-forming blades mounted to oscillate in the path of a circle, a movable device comprising a series of blades coöperating with and mounted between the forming-blades, a lever for effecting the movement of the said device, a cam member for actuating said lever, means for automatically coupling the cam member with the lever to depress the said device and means for automatically uncoupling the said members after the dough has been acted upon by the said device.

4. A machine for forming and indenting rolls of dough comprising in combination a plurality of roll-forming blades mounted to oscillate in the path of a circle and simultaneously displaceable, a device coöperating with and mounted between the forming-blades and consisting of a pin, and a series of blades carried by the pin and having a curvature corresponding to that of the forming blades, a lever for effecting the movement of said pin, a cam member for actuating said lever, means for automatically coupling the cam member with the lever after an initial movement of the former to depress the said device, and means for automatically uncoupling the said members after the roll has been formed and acted upon by the said device.

5. A machine for forming and indenting rolls comprising in combination a plurality of roll-forming blades mounted to oscillate in the path of a circle and simultaneously displaceable, a device coöperating with and mounted between the forming blades and having blades curved in correspondence with the forming blades, and a pin carrying said blades at one end, a lever for producing an upward and downward movement of said device, a cam member for actuating said lever and operated during the oscillatory movements of the forming blades, means for automatically coupling the cam member with the lever by means of a coöperating latch and pawl carried by the lever to produce a downward rotary movement of the lever, means for automatically uncoupling the said members after the said device has acted upon the dough, and resilient means for returning the lever into its initial position under spring action, after the roll has been formed and indented.

6. A machine for forming and indenting rolls of dough comprising in combination a plurality of roll-forming blades mounted to oscillate in the path of a circle, a movable device comprising a series of blades coöperating with and mounted between the forming-blades, means for automatically producing a downward movement of the said device, means for automatically effecting a downward movement of the forming-blades during their oscillatory movement, and means for automatically restoring the said device and forming-blades into their initial positions after the roll with its indentations has been completed.

7. A machine for forming and indenting rolls of dough comprising in combination a plurality of roll forming blades mounted to oscillate in the path of a circle and simultaneously displaceable, a device comprising a series of blades coöperating with and mounted between the forming-blades; a lever for effecting the movement of the said device, a cam-member for actuating said lever, means for automatically coupling the cam-member with the lever for producing the downward movement of the said device, a hook member adapted to engage with the cam member during a certain portion of its rotation to depress the forming-blades during their oscillatory movement, and means for automatically uncoupling the said members and returning the said device and forming blades into their initial positions after the roll with its indentations has been completed.

8. A machine for forming and indenting rolls comprising in combination a plurality of roll-forming blades mounted to oscillate, a device having a series of blades coöperating with and mounted between the forming-blades, a lever for effecting the downward movement of the said device, a cam member for actuating the lever, means comprising a latch and pawl for automatically coupling the cam member with the lever after an initial movement of the cam to produce the depression of the said device, means for automatically depressing the forming-blades during their oscillatory movement, and a stop member adapted to co-act with the said latch member to restore the said lever into its initial position.

9. A machine for forming and indenting rolls of dough, comprising a plurality of roll-forming blades, mechanism for actuating the same, a handle member for operating said mechanism, an indenting device having a series of blades coöperating with the roll-forming blades, a lever for effecting the downward movement of the indenting device, a cam member, means for actuating said lever from the cam member, and an operative connection between the handle member and the cam member.

10. A machine for forming and indenting rolls of dough, comprising a plurality of roll-forming blades, manually operated mechanism for actuating the same, an indenting device having a series of blades coöperating with the roll-forming blades, a lever for effecting the downward movement of the said indenting device, a cam member, means for coupling the cam member with the lever to depress the lever when the cam member is actuated, and means for actuating the cam member during the movement of the roll-forming blades.

In testimony whereof we have signed our names to the foregoing specification in the presence of two subscribing witnesses.

HEINRICH SIEGL.
JULIUS ENGEL.

Witnesses:
GUSTAV WOLFF,
AUGUST FUGGER.

---

Copies of this patent may be obtained for five cents each, by addressing the "Commissioner of Patents, Washington, D. C."